US011867363B2

(12) United States Patent
Sokolov

(10) Patent No.: US 11,867,363 B2
(45) Date of Patent: Jan. 9, 2024

(54) LED LAMP WITH MOLDED HOUSING/HEATSINK

(71) Applicant: Yuriy Borisovich Sokolov, Fryazino (RU)

(72) Inventor: Yuriy Borisovich Sokolov, Fryazino (RU)

( * ) Notice: Subject to any disclaimer, the term of this patent is extended or adjusted under 35 U.S.C. 154(b) by 0 days.

(21) Appl. No.: 17/797,047

(22) PCT Filed: Dec. 22, 2020

(86) PCT No.: PCT/RU2020/000741
§ 371 (c)(1),
(2) Date: Jan. 24, 2023

(87) PCT Pub. No.: WO2021/162579
PCT Pub. Date: Aug. 19, 2021

(65) Prior Publication Data
US 2023/0296210 A1 Sep. 21, 2023

(30) Foreign Application Priority Data
Feb. 11, 2020 (RU) ................................ 2020106318

(51) Int. Cl.
*F21K 9/238* (2016.01)
*F21V 3/08* (2018.01)
(Continued)

(52) U.S. Cl.
CPC ................ *F21K 9/238* (2016.08); *F21V 3/08* (2018.02); *F21V 23/005* (2013.01); *F21V 29/83* (2015.01);
(Continued)

(58) Field of Classification Search
CPC ... F21K 9/238; F21K 9/23; F21K 9/00; F21V 29/83; F21V 3/08; F21V 23/005;
(Continued)

(56) References Cited

U.S. PATENT DOCUMENTS 10,605,412 B1 * 3/2020 Garber .................... F21K 9/232
2014/0240990 A1 * 8/2014 Bae ......................... F21V 29/70
362/373
(Continued)

FOREIGN PATENT DOCUMENTS

EA 013862 B1 8/2010
RU 70050 U1 1/2008
(Continued)

*Primary Examiner* — Bao Q Truong

(74) *Attorney, Agent, or Firm* — Bryant J. Keller; Kirton McConkie

(57) ABSTRACT

The solution relates to lighting technology, namely to LED lamps powered directly from the AC mains. The technical result is to simplify the design, improve heat dissipation and reduce the labor intensity of manufacturing high-power lamps of general use, resistant to external influences>IP65, and with a minimum cost and labor intensity. In some cases, the LED lamp contains a radiator housing made in the form of a hollow cylindrical body made of an optically transparent material; a flexible aluminum printed circuit board, on a mounting surface of which LEDs and a driver are mounted; end caps, at least one of which is provided with means for connecting to a power supply network, while the flexible printed circuit board is configured in the form of a roll, the mounting surface is disposed outward, and part of the board with the driver is bent inside the roll, while the light-emitting surface of the LEDs is immersed in a transparent material housing, and the mounting surface of the configured printed circuit board has direct thermal contact with the transparent material.

7 Claims, 2 Drawing Sheets

Figure 1:
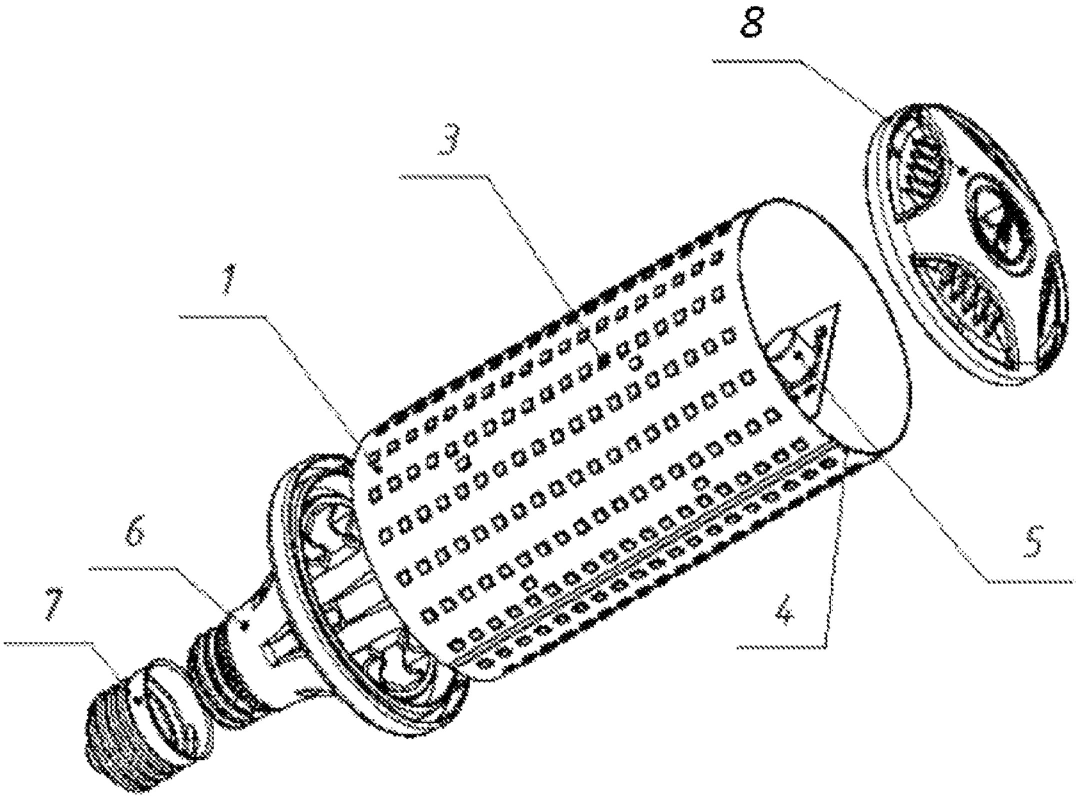

(51) Int. Cl.

| | |
|---|---|
| ***F21V 29/83*** | (2015.01) |
| ***F21V 23/00*** | (2015.01) |
| *F21Y 107/30* | (2016.01) |
| *F21Y 115/10* | (2016.01) |
| *F21Y 107/70* | (2016.01) |

(52) U.S. Cl.
CPC ....... *F21Y 2107/30* (2016.08); *F21Y 2107/70* (2016.08); *F21Y 2115/10* (2016.08)

(58) Field of Classification Search
CPC ...... F21V 23/00; F21V 23/003; F21V 23/004; F21Y 2107/30; F21Y 2115/10; F21Y 2107/70
See application file for complete search history.

(56) References Cited

U.S. PATENT DOCUMENTS

| | | | | |
|---|---|---|---|---|
| 2015/0016110 | A1* | 1/2015 | Kim | F21K 9/232 313/317 |
| 2016/0084482 | A1 | 3/2016 | Speer et al. | |
| 2016/0341370 | A1* | 11/2016 | Dekker | F21V 29/60 |
| 2019/0249831 | A1* | 8/2019 | Liu | F21V 23/0492 |
| 2019/0331302 | A1 | 10/2019 | Cai et al. | |

FOREIGN PATENT DOCUMENTS

| | | | |
|---|---|---|---|
| RU | 2537828 | C1 | 1/2015 |
| RU | 2556531 | C2 | 7/2015 |
| RU | 170312 | U1 | 4/2017 |
| WO | 2015/129419 | A1 | 9/2015 |

* cited by examiner

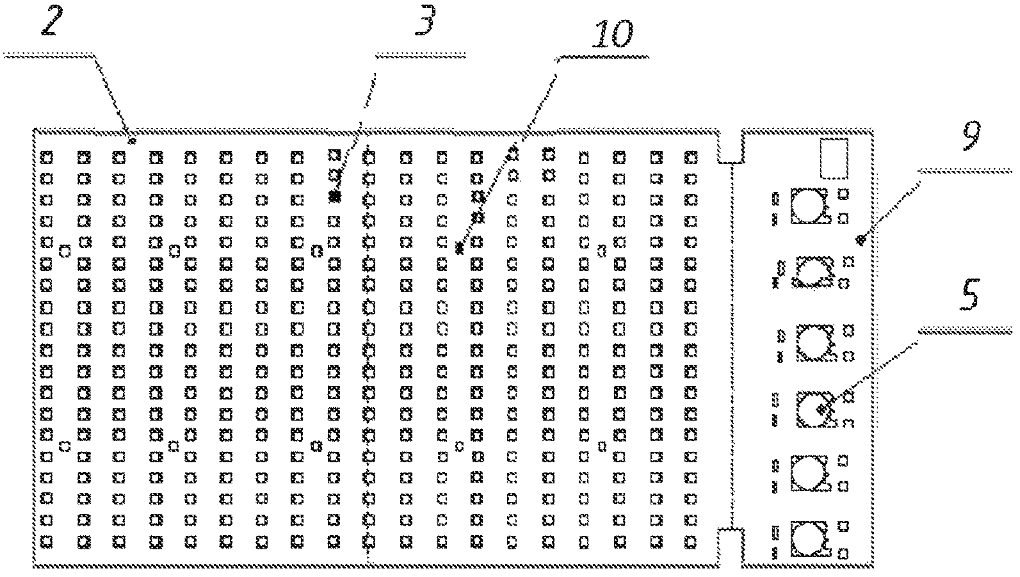
Fig.3
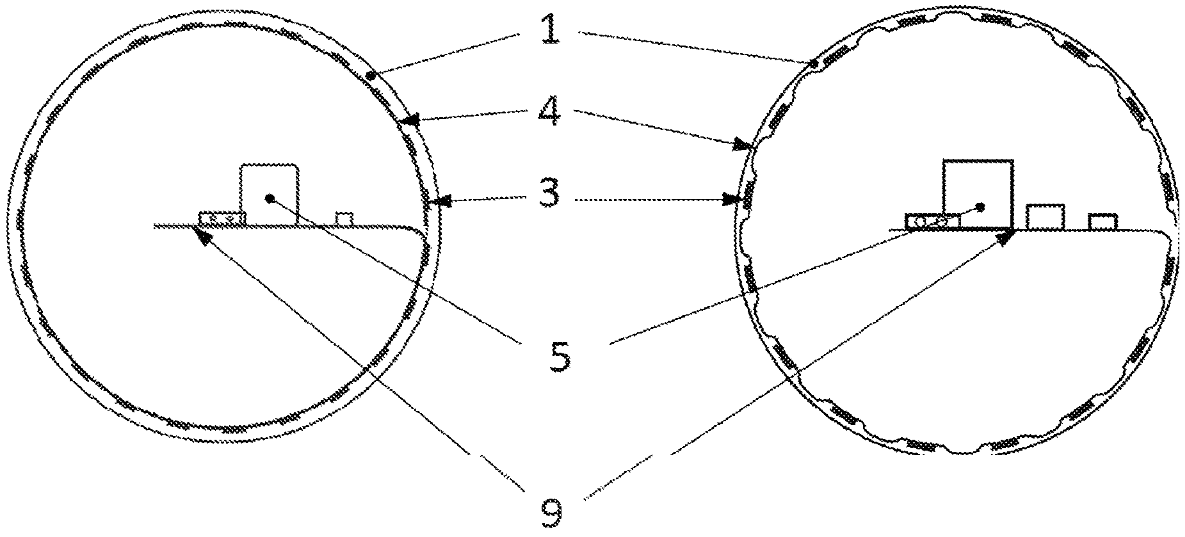
Fig.4
Fig.5

LED LAMP WITH MOLDED HOUSING/HEATSINK

TECHNOLOGY AREA

The claimed solution relates to lighting engineering, namely to LED lamps powered directly from the AC mains.

PRIOR ART

It is known that LED lamps need to remove heat from drivers and, especially, from LEDs, since approximately 50% of the electrical energy supplying LEDs is converted into heat, which causes overheating of LEDs and their failure, if heat is not provided for the environment. This is especially true for lamps with a power of more than 7-8 watts. For such lamps, special radiators are usually created through which heat goes into space. These radiators significantly complicate the design of the lamps and increase their dimensions. At the same time, in a typical lamp design, the bulb cavity is filled with air having a low thermal conductivity of ~0.02 W /Km and the material of the bulb itself is polycarbonate (0.3 W/Km) is also actually a thermal insulator, therefore the heat coming from the LEDs in the direction of light emission is practically blocked.

Known LED lamp containing a metal radiator in the form of a multifaceted prism, on the edges of which printed circuit boards are placed, and a cylindrical light diffuser covers the said prism, while the end caps are provided with through holes for convection heat exchange, one of which is equipped with a means of connecting to the power supply network (WO 2015/129419 A1, IPC F21V29/50, published 03.09.2015).

The disadvantage of the analogue is the need for an overall radiator, limiting the increase in the luminous power of the lamp due to the occurrence of problems with the removal of excess thermal energy emitted by LEDs.

Known LED lamp containing a light diffuser in the form of a piece of glass pipe of circular cross-section, a flexible printed circuit board, on the mounting surface of which a plurality of LEDs are mounted, and which by the reverse side of the board is pressed by spring holders to the inner surface of the light diffuser for heat exchange, and end caps, one of which is equipped with a means for connecting to the power supply network (U.S. 2016084482 A1, IPC F21V19/00, published Mar. 24, 2016).

The radially curved board of the said analogue is placed on a segment of the inner surface of the glass diffuser so that the LED radiation is directed to the opposite inner wall of the glass diffuser, which limits the radiation angle, while excess heat is removed from the LEDs from the back side of the board through two interfaces: from the LEDs to the board and from the board to the body of the glass diffuser through the air gap.

Known LED lamp containing a sealed light diffuser in the form of a glass tube of circular cross-section and a group of filament light sources longitudinally fixed on a metal armature, enclosed in a silicone shell, which is installed in thermal contact with the inner surface of the light diffuser. To improve heat dissipation, a heat-dissipating paste is placed between the silicone shell and the glass body, filling the air gap, while the cavity of the glass diffuser is filled with a heat-conducting gas (U.S. 20190331302, IPC F21K 9/232, published on Oct. 31, 2019).

The disadvantage of the known analogue is the complexity of the lamp design and the difficulty of removing excess heat from light sources through several media boundaries:

from LEDs to silicone, from silicone to a glass body through a gap filled with heat-conducting paste, or from silicone through a heat-conducting gas to the glass body, so the power such lamps do not exceed 7 . . . 10 watts.

The technical result of the claimed solution is to forgive the design, improve heat dissipation and reduce the labor intensity of manufacturing high-power lamps for general use, resistant to external influences with >IP65, and with a minimum cost and labor intensity.

DISCLOSURE

The claimed solution is characterized by the following features: a radiator housing containing a hollow transparent cylinder, two covers connected to the ends of this cylinder, and one of the covers includes a base for connection to the electrical network, a flexible printed circuit board with LEDs mounted on one part of the mounting surface of the printed circuit board and components of the driver on the other separate part of this surface, wherein the printed circuit board is bent into a roll in such a manner, that the LEDs are located on the outer side of the roll, and a part printed circuit board with components driver folded inwardly of the hollow cylinder. At the ends of the cylinder, covers are installed, which are securely fastened to the printed circuit board with the help of glue embedded in the slots of the covers, and the conductors coming from the driver are connected to the base, which is fixed on one of the covers. The lamp body is formed of a transparent (matte) material, for example, of transparent polyurethane, which is placed between the inner cylindrical surface of the tooling (not shown in the figures) and the mounting surface of the printed circuit board with LEDs so that a transparent layer with a thickness of 0 is formed above the emitting surface of the LEDs. 2 . . . 0.5 mm, which is determined by the inner diameter of the tooling, and its centering in this case is guaranteed by stops in the form of special SMT components, which are installed on the board in a circle at a certain distance, and having a height greater than the height of the LEDs by the amount of the thickness of the transparent layer above the LEDs.

After fixing the transparent layer, the lamp is ready for use. To speed up the curing process, the lamp can be connected to the network and, accordingly, be heated to a certain temperature. With a LED height of 0.7 mm and a layer thickness above them of ~0.4 mm, a layer with a thickness of 1.1 mm is formed above the PCB mounting surface. To improve heat dissipation, the thickness of the layer on the surface of the printed circuit board can be adjusted by profiling the surface of the tooling in the gaps between the LEDs, or by sequentially applying a transparent layer on the surface of the printed circuit board. Thus, it is possible to make lamps with a power of up to 100 W or more, it all depends on the surface area of the housing, which is a supporting element, a radiator, a light diffuser and an electrical insulator. In general, you can be guided by the size of the area 7 ... 12 $cm^2$ per watt of lamp power.

When the lamp power is high, holes are made in the end caps of the plastic and, thus, the inner surface of the aluminum printed circuit board is included in the LED cooling system, which significantly improves the efficiency of heat dissipation.

When installing an LED lamp in an already operating illuminator, you can use a lamp version in which the LEDs are mounted only on a part of the surface area of the printed circuit board that provides an illumination angle, for example, 90°, since the reflectivity of old illuminators is reduced and it makes sense to save on LEDs. In this case, the cover with an electric base consists of two parts that allow you to orient the luminous flux to the illuminated object after screwing the lamp into the socket.

THE FIGURES SHOW

Figure 2:
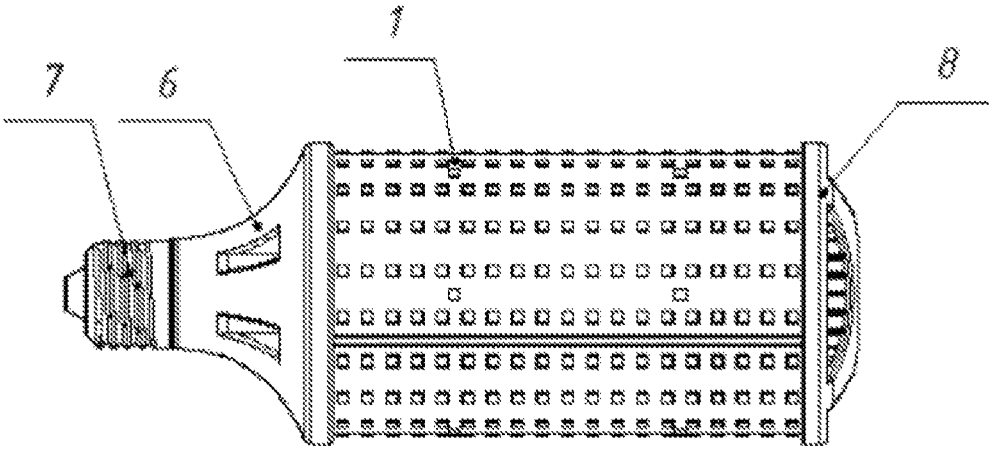

FIG. 1—volumetric image of a disassembled version of the lamp,

FIG. 2 is a side view of the lamp shown in FIG. 1, assembled,

FIG. 3—scan of the version of the printed circuit board of the lamp shown in FIG. 1, in FIGS. 4 and 5—a cross-section of variants of a lamp with a printed circuit board in the material of the body/radiator.

POSITIONS IN THE FIGURES INDICATE

1—body/radiator,

2—development of a flexible printed circuit board,

3—LEDs,

4—flexible printed circuit board configured in a roll,

5—driver components,

6—first end cap of the body,

7—means for connecting to the power supply network (base),

8—the second end cap of the body,

9—part of the board with the driver,

10—technological protrusions on the printed circuit board.

All components are installed on SMT machines in one installation, therefore, a sequential power supply is used that does not have external components (filters, etc.) that require fixing in the holes of the printed circuit board.

The flat printed circuit board 2 (FIG. 3) is rolled into a roll with the mounting surface outward and installed in a mandrel, in which the transparent material is placed on the emitting surface of the LEDs and on the mounting surface of the printed circuit board, after curing the transparent material, the LEDs and the mounting surface of the printed circuit board are fixed transparent material. Thus, the transparent material performs several functions: it forms the lamp body and the cooling radiator, the radiation diffuser, and ensures the isolation of live parts from contact.

To form the body, various transparent materials can be used that have high light transmittance and temperature resistance , withstand thermal contact with the LED body without destruction , and do not poison the LED. For example, among a number of known transparent resins (acrylic, epoxy, polyurethane), the most suitable are polyurethane resin-based compounds with a thermal conductivity that, at a distance of less than 1 mm from the light-emitting surface of the LED and to the outer surface of the diffuser, provides sufficient heat exchange with atmospheric air.

Also the thermal conductivity and efficiency of such a body/heat sink is quite good due to the good adhesion and lack of air between the PCB and the body.

End caps 6 and 8 can be glued. The second plug 8 can be transparent, and then, if there are 2 bends in the configured flexible printed circuit board with installed LEDs, the lamp will provide a full illumination angle. The presence of through holes (not shown in the drawings) in the end caps provides efficient convection cooling of the back side of the printed circuit board.

The LED lamp has a point radiation, which is not very good for indoor lighting, but this effect can be reduced by installing LEDs with a small pitch or forming a transparent (matte) material with added phosphor or diffuser particles, which will simultaneously improve heat transfer from the LEDs to the external heat exchange surface.

For effective cooling, it is advisable to maintain the temperature of the board and the diffuser at the level of 70-75° C., then there is radiant heat radiation along with convection. When using efficient LEDs (>200 Im/W), the real luminous flux efficiency will be ~160-170 Im/W (losses in the diffuser ~5%, losses when the LEDs are heated to 85° C. (crystal) ~10%). Then, with a power of 30 W on LEDs, the luminous flux can reach 5000 Im. The overall efficiency of the lamp will be lower by the value of the driver efficiency (~0.896) and will be about 147 Im/W.

The invention claimed is:

1. An LED lamp, containing:

a hollow cylindrical housing, the walls of which are made of an optically transparent material, equipped with end caps, one of which has means of connection to a power supply network; and a flexible printed circuit board having a mounting surface, on one part of which there are LEDs, and on another part of the mounting surface are disposed driver components, wherein the flexible printed circuit board is placed in a cavity of the hollow cylindrical housing in such a way that the one part of the mounting surface on which the LEDs are installed is rolled up in a form of a roll with the mounting surface being disposed outward, while the LEDs are immersed in the wall of the cylindrical housing, wherein the other part of the flexible printed circuit board carrying the driver components is bent inside said roll of the printed circuit board, wherein, a seating surface of the printed circuit board is connected by adhesion forces to a material of the wall of the hollow cylindrical housing.

2. The LED lamp according to claim 1, wherein the driver components are arranged as a sequential driver.

3. The LED lamp according to claim 1, wherein a thickness of a layer of the optically transparent material on at least one of: (i) a surface of the flexible printed circuit board, (ii) a housing of each of the LEDs, and (iii) it's a light-emitting surface of each of the LEDs is 0.2-0.5 mm.

4. The LED lamp according to claim 1, wherein the optically transparent material contains phosphor particles.

5. The LED lamp according to claim 1, wherein the LEDs are mounted on a part of a perimeter surface of the flexible printed circuit board that is in the form of the roll.

6. The LED lamp according to claim 1, wherein the end caps are provided with through holes to remove convection heat.

7. The LED lamp according to claim 1, wherein the flexible printed circuit board has a raised relief surface between the LEDs.

* * * * *